(12) United States Patent
Kiik et al.

(10) Patent No.: US 6,673,432 B2
(45) Date of Patent: *Jan. 6, 2004

(54) WATER VAPOR BARRIER STRUCTURAL ARTICLE

(75) Inventors: Matti Kiik, Richardson, TX (US);
Daniel LaVietes, DeSoto, TX (US);
Younger Ahluwalia, DeSoto, TX (US)

(73) Assignee: Elk Premium Building Products, Inc., Dallas, TX (US)

( * ) Notice: Subject to any disclaimer, the term of this patent is extended or adjusted under 35 U.S.C. 154(b) by 147 days.

This patent is subject to a terminal disclaimer.

(21) Appl. No.: 09/897,308

(22) Filed: Jul. 2, 2001

(65) Prior Publication Data

US 2002/0160210 A1 Oct. 31, 2002

Related U.S. Application Data

(63) Continuation-in-part of application No. 09/663,255, filed on Sep. 15, 2000, now Pat. No. 6,586,353.
(60) Provisional application No. 60/168,057, filed on Nov. 30, 1999.

(51) Int. Cl.⁷ .......................... B32B 15/14; B32B 27/00
(52) U.S. Cl. .............................. 428/301.1; 428/297.4; 428/300.7; 428/457; 428/458; 428/461; 428/463
(58) Field of Search ................. 428/457, 458, 428/461, 141, 297.4, 300.7, 463, 301.1

(56) References Cited

U.S. PATENT DOCUMENTS

| | | |
|---|---|---|
| 74,606 A | 2/1868 | Schanck |
| 79,645 A | 7/1868 | Ferguson |
| 83,539 A | 10/1868 | Pinner |
| 3,603,221 A | 9/1971 | Barton et al. .................. 404/31 |
| 3,616,173 A | 10/1971 | Green et al. .................. 428/331 |
| 3,634,293 A | 1/1972 | Bonitz ............................ 524/8 |
| 3,721,578 A | 3/1973 | Bennett et al. ................ 117/92 |
| 3,841,885 A | 10/1974 | Jakel ........................... 106/93 |
| 3,954,555 A | 5/1976 | Kole et al. .................... 162/136 |
| 3,992,340 A | 11/1976 | Bonitz ........................ 260/28.5 A |
| 4,044,188 A | 8/1977 | Segal ............................ 428/283 |
| 4,073,997 A | 2/1978 | Richards et al. ............... 428/285 |
| 4,079,158 A | 3/1978 | Kennepohl et al. .......... 428/143 |
| 4,082,885 A | 4/1978 | Rashid et al. ................. 428/281 |
| 4,130,516 A | 12/1978 | Gagle et al. ................. 260/28.5 |
| 4,135,022 A | 1/1979 | Kennepohl et al. .......... 428/143 |
| 4,186,236 A | 1/1980 | Heitmann ..................... 428/291 |
| 4,212,912 A | 7/1980 | Wartusch et al. ............ 428/209 |
| 4,212,913 A | 7/1980 | Auten .......................... 428/285 |
| 4,214,032 A | 7/1980 | Cskiós et al. ................. 428/280 |
| 4,229,329 A | 10/1980 | Bennett ....................... 260/17 R |
| 4,265,962 A | 5/1981 | May ............................ 428/287 |
| 4,273,685 A | 6/1981 | Marzocchi et al. ..... 460/28.5 R |
| 4,291,086 A | 9/1981 | Auten .......................... 428/242 |
| 4,306,911 A | 12/1981 | Gordon et al. ................ 106/99 |
| 4,313,968 A | 2/1982 | Sickles et al. ................ 427/27 |
| 4,331,726 A | 5/1982 | Cleary ......................... 428/143 |
| 4,332,705 A | 6/1982 | Uffner ......................... 523/206 |
| 4,388,366 A | 6/1983 | Rosato et al. ............... 428/285 |
| 4,405,680 A | 9/1983 | Hansen ....................... 428/285 |
| 4,460,737 A | 7/1984 | Evans et al. ................ 524/584 |
| 4,468,430 A | 8/1984 | Ruede ......................... 428/291 |
| 4,472,243 A | 9/1984 | Bondoc et al. .............. 162/135 |
| 4,473,610 A | 9/1984 | Davis .......................... 428/143 |
| 4,478,610 A | 10/1984 | Parekh et al. ................. 51/298 |
| 4,506,060 A | 3/1985 | White, Sr. et al. ........... 525/163 |
| 4,513,045 A | 4/1985 | Bondoc et al. .............. 428/137 |
| 4,521,478 A | 6/1985 | Hageman .................... 428/287 |
| 4,555,543 A | 11/1985 | Effenberger et al. ........ 524/520 |
| 4,559,267 A | 12/1985 | Freshwater et al. ......... 428/352 |
| 4,560,612 A | 12/1985 | Yau ............................. 428/288 |
| 4,571,356 A | 2/1986 | White, Sr. et al. ........... 428/143 |
| 4,585,682 A * | 4/1986 | Colarusso et al. ............. 428/57 |
| 4,599,258 A | 7/1986 | Hageman .................... 428/140 |
| 4,600,635 A * | 7/1986 | Wiercinski et al. ......... 428/220 |
| 4,609,709 A | 9/1986 | Yau ............................. 525/164 |
| 4,610,918 A | 9/1986 | Effenberger et al. ........ 428/245 |
| 4,612,238 A | 9/1986 | DellaVecchia et al. ...... 428/228 |
| 4,647,496 A | 3/1987 | Lehnert et al. .............. 428/251 |

(List continued on next page.)

FOREIGN PATENT DOCUMENTS

| | | |
|---|---|---|
| DE | 289082 | 4/1991 |
| DE | 19729533 | 1/1999 |
| EP | 764748 | 3/1997 |
| GB | 1228592 | 5/1971 |
| RU | 564374 | 7/1977 |
| WO | PCT/US87/01474 | 1/1988 |
| WO | 9900338 | 1/1999 |

OTHER PUBLICATIONS

Correspondence from Elk Corporation to Fontana Paper Mill dated Jul. 30, 1999 and Aug. 19, 1999, including a copy of the Confidentiality Agreement executed between these two parties covering three samples supplied by Elk to Fontana Paper Mill for confidential evaluation.

Product description for Tough–Guard® Roof Eave and Valley Protector reprinted from the Georgia–Pacific Web site, the URL of which is http://www.gp.com/roofing/pdf/041700.pdf, 1996.

Primary Examiner—Monique R. Jackson
(74) Attorney, Agent, or Firm—Baker Botts L.L.P.

(57) ABSTRACT

A structural article comprises a substrate having an ionic charge coated on one side with a coating having essentially the same ionic charge and covered on the other side with a water vapor impermeable material selected from the roof consisting essentially of metal foils and preformed plastic films. The coating consists essentially of a filler material and a binder material and the binder material bonds the filler material together and to the substrate. The water vapor impermeable material is attached to the coated substrate with an adhesive. In additional embodiments, the substrate is coated on both sides with a coating having essentially the same ionic charge and the article so coated is then covered on one or both sides with the water vapor impermeable material.

12 Claims, No Drawings

U.S. PATENT DOCUMENTS

| | | | | |
|---|---|---|---|---|
| 4,654,235 | A | 3/1987 | Effenberger et al. | 427/407.3 |
| 4,664,707 | A | 5/1987 | Wilson et al. | 106/18.11 |
| 4,683,165 | A | 7/1987 | Lindemann et al. | 428/290 |
| 4,738,884 | A | 4/1988 | Algrim et al. | 428/57 |
| 4,745,032 | A | 5/1988 | Morrison | 428/215 |
| 4,746,560 | A | 5/1988 | Goeden | 428/151 |
| 4,755,545 | A | 7/1988 | Lalwani | 524/64 |
| 4,764,420 | A | 8/1988 | Gluck et al. | 428/317.7 |
| 4,784,897 | A | 11/1988 | Brands et al. | 428/219 |
| 4,810,569 | A | 3/1989 | Lehnert et al. | 428/285 |
| 4,835,004 | A | 5/1989 | Kawanishi | 427/13 |
| 4,837,095 | A | 6/1989 | Hageman | 428/287 |
| 4,879,173 | A | 11/1989 | Randall | 428/285 |
| 4,889,880 | A | 12/1989 | Miller | 524/71 |
| 4,917,764 | A | 4/1990 | Lalwani et al. | 162/156 |
| 4,944,818 | A | 7/1990 | Dybsky et al. | 156/71 |
| 5,001,005 | A | 3/1991 | Blanpied | 428/283 |
| 5,015,711 | A | 5/1991 | Simonet et al. | 526/301 |
| 5,019,610 | A | 5/1991 | Sitz et al. | 524/61 |
| 5,030,507 | A | 7/1991 | Mudge et al. | 428/288 |
| 5,099,627 | A | 3/1992 | Coulton et al. | 52/408 |
| 5,110,839 | A | 5/1992 | Chao | 521/83 |
| 5,112,678 | A | 5/1992 | Gay et al. | 428/268 |
| 5,148,645 | A | 9/1992 | Lehnert et al. | 52/443 |
| 5,192,366 | A | 3/1993 | Nishioka et al. | 106/724 |
| 5,220,762 | A | 6/1993 | Lehnert et al. | 52/408 |
| 5,232,530 | A | 8/1993 | Malmquist et al. | 156/78 |
| 5,318,844 | A | 6/1994 | Brandon | 428/357 |
| 5,334,648 | A | 8/1994 | Drews et al. | 524/512 |
| 5,342,680 | A | 8/1994 | Randall | 428/285 |
| 5,347,785 | A | 9/1994 | Terrenzio et al. | 52/555 |
| 5,369,929 | A | 12/1994 | Weaver et al. | 52/557 |
| 5,371,989 | A | 12/1994 | Lehnert et al. | 52/309.17 |
| 5,391,417 | A | 2/1995 | Pike | 428/143 |
| 5,393,794 | A | 2/1995 | Sperber | 521/78 |
| 5,397,631 | A | 3/1995 | Green et al. | 428/219 |
| 5,401,588 | A | 3/1995 | Garvey et al. | 428/703 |
| 5,437,717 | A | 8/1995 | Doyle et al. | 106/220 |
| 5,437,923 | A | 8/1995 | Kalkanoglu | 428/291 |
| 5,445,878 | A | 8/1995 | Mirous | 428/288 |
| 5,476,542 | A | 12/1995 | Doyle et al. | 106/219 |
| 5,496,400 | A | 3/1996 | Doyle et al. | 106/220 |
| 5,501,730 | A | 3/1996 | Duong et al. | 106/281.1 |
| 5,518,586 | A | 5/1996 | Mirous | 162/156 |
| 5,573,586 | A | 11/1996 | Yap et al. | 106/668 |
| 5,580,376 | A | 12/1996 | Hayner | 106/284.1 |
| 5,580,378 | A | 12/1996 | Shulman | 106/677 |
| 5,601,680 | A | 2/1997 | Kuszaj et al. | 156/242 |
| 5,601,888 | A | 2/1997 | Fowler | 428/34 |
| 5,604,274 | A | 2/1997 | Gallagher et al. | 524/69 |
| 5,665,442 | A | 9/1997 | Andersen et al. | 428/36.4 |
| 5,687,517 | A | 11/1997 | Wiercinski et al. | 52/177 |
| 5,698,304 | A | 12/1997 | Brandon et al. | 428/215 |
| 5,717,012 | A | 2/1998 | Bondoc et al. | 524/13 |
| 5,718,785 | A | 2/1998 | Randall | 156/39 |
| 5,776,841 | A | 7/1998 | Bondoc et al. | 442/320 |
| 5,795,380 | A | 8/1998 | Billings et al. | 106/675 |
| 5,884,446 | A | 3/1999 | Hageman | 52/408 |
| 5,965,257 | A | 10/1999 | Ahluwalia | 428/357 |

\* cited by examiner

WATER VAPOR BARRIER STRUCTURAL ARTICLE

CROSS REFERENCE TO RELATED APPLICATIONS

This application is a continuation-in-part of pending U.S. application Ser. No. 09/663,255 filed on Sep. 15, 2000, now U.S. Pat. No. 6,536,353, which claims priority under 35 U.S.C. § 119(e) to Provisional Application No. 60/168,057, filed Nov. 30, 1999.

BACKGROUND OF THE INVENTION

This invention relates to structural articles which include water vapor impermeable materials such as metal foils and preformed plastic films. Those structural articles of the present invention which include metal foils may also be useful as radiant energy barriers and as flame and heat dissipating barriers.

For many years substrates such as fiberglass have been coated with various compositions to produce structural articles having utility in, among other applications, the building industry. U.S. Pat. No. 5,001,005 relates to structural laminates made with facing sheets. The laminates described in that patent include thermosetting plastic foam and have planar facing sheets comprising 60% to 90% by weight glass fibers (exclusive of glass micro-fibers), 10% to 40% by weight non-glass filler material and 1% to 30% by weight non-asphaltic binder material. The filler materials are indicated as being clay, mica, talc, limestone (calcium carbonate), gypsum (calcium sulfate), aluminum trihydrate (ATH), antimony oxide, cellulose fibers, plastic polymer fibers or a combination of any two or more of those substances. The patent further notes that the filler materials are bonded to the glass fibers using binders such as urea-, phenol- or melamine-formaldehyde resins (UF, PF, and MF resins), or a modified acrylic or polyester resin. Ordinary polymer latexes used according to the disclosure are Styrene-Butadiene-Rubber (SBR), Ethylene-Vinyl-Chloride (EVCl), Polyvinylidene Chloride (PVDC), modified Polyvinyl Chloride (PVC), Polyvinyl Alcohol (PVOH), and Polyvinyl Acetate (PVA).

U.S. Pat. No. 4,745,032 discloses an acrylic coating comprised of one acrylic underlying resin which includes fly ash and an overlying acrylic resin which differs from the underlying resin. U.S. Pat. No. 4,229,329 discloses a fire retardant coating composition comprising fly ash and vinyl acrylic polymer emulsion. The fly ash is 24 to 50% of the composition. U.S. Pat. No. 4,784,897 discloses a cover layer material on a basis of matting or fabric which includes calcium carbonate powder and a polystyrene-butadiene dispersion.

Many different coating compositions have been formulated over the years but often such compositions would bleed through substrates, such as fiberglass substrates, if the substrates were coated on just one side, unless the compositions had a high binder content and/or included viscosity modifiers to enhance the viscosity of the coating composition. To prevent bleed through, such coating compositions sometimes had their viscosity increased by blowing or whipping air into the compositions. Although such blown compositions did not bleed through to the other side of mats such as fiberglass mats, the raw material costs for the compositions were high because of the numbers of constituent elements involved.

U.S. Pat. No. 5,965,257 discloses a structural article having a coating which includes only two major constituents, while eliminating the need for viscosity modifiers, for stabilizers or for blowing. The structural article of U.S. Pat. No. 5,965,257 is made by coating a substrate having an ionic charge with a coating having essentially the same iconic charge. The coating consists essentially of a filler material and a binder material. By coating the substrate with a coating having essentially the same ionic charge, the patentee developed a zero bleed through product while using only two major ingredients in the coating and eliminating the need for costly and time consuming processing steps such as blowing. Structural articles may thus be produced having a low binder content and no viscosity modifiers. U.S. Pat. No. 5,965,257 issued to Elk Corporation of Dallas, the assignee of the present application. Elk produces a product in accordance with the invention of U.S. Pat. No. 5,965,257 which is marketed as VersaShield®.

As indicated in U.S. Pat. No. 5,965,257, VersaShield® has many uses, including utility as a moisture barrier. However, it has been found that the products of U.S. Pat. No. 5,965,257 are unable to provide a satisfactory water vapor barrier. In newly constructed office buildings, owners and tenants frequently desire to have carpeting layed down on concrete floors before sufficient time has passed for the concrete to completely cure. As a result, the water vapor which rises from the concrete often stains the carpet, requiring costly cleaning and/or removal. Although the products of U.S. Pat. No. 5,965,257 provide a moisture barrier, they do not provide a sufficient water vapor barrier and accordingly, they cannot satisfactorily serve in applications where vapor barriers are important, such as in interplies or underlayment between incompletely cured concrete floors and carpeting. The applicants have discovered, however, that by covering the structural articles of U.S. Pat. No. 5,965,257 with metal foils or preformed plastic films, the covered structural articles become essentially water vapor impermeable. Additionally, the applicants have discovered that when the structural articles of U.S. Pat. No. 5,965,257 are covered with metal foils, the structural articles also may be useful as radiant energy barriers and as flame and heat dissipating barriers.

SUMMARY OF THE INVENTION

In accordance with the invention, a structural article is made by coating one side of a substrate having an ionic charge with a coating having essentially the same ionic charge and covering the other side of the substrate with a water vapor impermeable material selected from the group consisting essentially of metal foils and preformed plastic films. The aforementioned coating consists essentially of a filler material and a binder material. The binder material bonds the filler material together and to the substrate. The coating does not bleed through the substrate. The water vapor impermeable material is attached to the other side of the substrate with an adhesive. Alternatively, structural articles may be made by coating both sides of a substrate having an ionic charge with a coating having essentially the same ionic charge. Again, the coating consists essentially of a filler material and a binder material, the coating does not bleed through the substrate and the binder material bonds the filler material together and to the substrate. In such embodiments, one side of the coated substrate is covered with a water vapor impermeable material selected from the group consisting essentially of metal foils and preformed plastic films. Again, the material is attached to the coated substrate with an adhesive. In other embodiments, one side of the coated substrate is covered with a metal foil water vapor impermeable material and the other side of the coated substrate is covered with a preformed plastic film water vapor impermeable material. Both materials are attached to the coated substrate with an adhesive. In further embodiments, both sides of the coated substrate are coated with the same water vapor impermeable material.

The adhesive which is used to attach the water vapor impermeable material to the substrate, or to the coated substrate as the case may be, is selected from the group consisting essentially of low density polyethylene, high density polyethylene, polyethylene-vinyl acetate, polyesters polypropylene, polyvinylidene chloride, nylon and mixtures thereof.

In one embodiment, the coating is from 84% to 96% filler selected from the group consisting of fly ash, charged calcium carbonate, ceramic microspheres and mixtures thereof and from 16% to 4% acrylic latex binder materials. The coating may further include SBR rubber. The acrylic latex binder and the rubber may be cross-linked. In certain embodiments, the substrate consists essentially of glass fibers bonded together by a mixture of from 99% to 75% urea formaldehyde resin and from 1% to 25% acrylic latex.

The coated substrate of the present invention may be any suitable reinforcement material capable of withstanding processing temperatures, such as glass fibers, polyester fibers, cellulosic fibers, asbestos, steel fibers, alumina fibers, ceramic fibers, nylon fibers, graphite fibers, wool fibers, boron fibers, carbon fibers, jute fibers, polyolefin fibers, polystyrene fibers, acrylic fibers, phenolformaldehyde resin fibers, aromatic and aliphatic polyamide fibers, polyacrylamide fibers, polyacrylimide fibers or mixtures thereof which may include bicomponent fibers.

The filler may be class F fly ash wherein 90% to 95% by weight of the fly ash is aluminosilicate. Such a fly ash, known as Alsil 04TR, is produced by JTM Industries of Kennesaw, Ga. Alternatively, the filler may be charged calcium carbonate or ceramic microspheres, or a blend of fly ash and calcium carbonate, or a blend of fly ash, calcium carbonate and ceramic microspheres or any combination of these filler materials to meet desired cost and weight criteria. Calcium carbonate and fly ash filler increase the weight of the product, but utilization of ceramic microspheres enables the manufacture of a product with reduced weight and increased fire resistant properties. Ceramic microspheres can withstand heat greater than 2000° F. Also, ceramic microspheres increase compressive strength, absorb no latex and/or water and thus permit the faster drying of the product. Ceramic microspheres also increase product flexibility.

Further, the ceramic microspheres help to increase the pot life of the coating. Larger agglomerates in the calcium carbonate and fly ash filler, although they may comprise but a small percentage of the particles in the filler, have a tendency to settle near the bottom of a storage vessel. When ceramic microspheres are mixed together with calcium carbonate and/or fly ash filler, a dispersion is produced which has an increased pot life or shelf life. Without wishing to be bound by any particular theory, it is believed that as the filler particles naturally fall in the vessel and the ceramic microspheres rise, the more dense filler particles are supported by the low density ceramic microspheres, thus enabling the microspheres to stay in suspension and preventing the filler particles, to at least some extent, from descending to the bottom of the vessel.

The table below provides, in percentages, some of the combinations of calcium carbonate, fly ash and ceramic microspheres which applicant has utilized as the filler component in the coating:

TABLE I

| | A % | B % | C % | D % | E % | F % |
|---|---|---|---|---|---|---|
| 1. Water | 18.9 | 25.9 | 30.87 | 25.9 | 24.9 | 24.9 |
| 2. Acrylic Latex | 6.0 | 6.0 | 9.20 | 6.0 | 6.0 | 6.0 |
| 3. Fly Ash | 75.0 | 34.0 | — | 40.0 | — | 20.0 |
| 4. CaCO₃ | — | 34.0 | 55.07 | — | 40.0 | 20.0 |
| 5. Microspheres | — | — | 4.76 | 29.0 | 29.0 | 29.0 |
| 6. Defoamer | 0.1 | 0.1 | 0.1 | 0.1 | 0.1 | 0.1 |
| | 100% | 100% | 100% | 100% | 100% | 100% |

The microspheres were a 50/50 ratio of 3M's W1012 microspheres and 3M's smaller diameter G200 microspheres or 100% 3M's G-3500 microspheres. Although the table shows possible combinations of calcium carbonate, fly ash and ceramic micro spheres in the filler component of the coating, it is believed that any combination of these materials may be employed.

The coating is prepared by using a binder material such as a high performance heat-reactive acrylic latex polymer to bond the filler materials together and to bond the filler to the substrate. Such a binder material is Hycar 2679 acrylic latex polymer supplied by B. F. Goodrich Company of Cleveland, Ohio. It is believed, however, that any linear polymer, linear copolymer or branched polymer may be useful in preparing the coating. Possible binder materials include butyl rubber latex, SBR latex, neoprene latex, polyvinyl alcohol copolymer emulsions, SBS latex, water based polyurethane emulsions and elastomers, vinyl chloride copolymers, nitrile rubbers and polyvinyl acetate copolymers.

In a preferred embodiment the coating comprises nearly 85% by weight of the structural article. In that coating, approximately from 84% to 96% by weight is filler and the remainder is the acrylic latex binder. The filler is approximately 92% charged calcium carbonate and 8% ceramic microspheres. The substrate comprises about 15% by weight of the structural article. Glass fibers comprise approximately 12% by weight of the article and a binder material comprises about 3% by weight of the article. The binder which bonds together the glass fibers is from 99% to 75% (preferably 98% to 94%) by weight urea formaldehyde resin and from 1% to 25% (preferably 2% to 6%) by weight standard acrylic latex.

The substrate may be coated by air spraying, dip coating, knife coating, roll coating or rotogravure printing. The coating may be bonded to the substrate by chemical bonding, mechanical bonding and/or thermal bonding. Mechanical bonding is achieved by force feeding the coating onto the substrate with a knife.

Structural articles made in accordance with this invention may be of any shape and may be used in any of a variety of products. Preferably, such articles are planar in shape. The substrate is coated on one side or both sides depending on the intended application. For instance, if one side of the substrate is coated with the filler/binder coating, the other surface can be covered with the appropriate water vapor impermeable material.

DETAILED DESCRIPTION

Structural articles are made by coating a substrate having an anionic charge with a coating having essentially the same ionic charge. Any suitable reinforcement material capable of withstanding processing temperatures may be employed as a substrate in accordance with the invention. Examples include, inter alia, glass, fiberglass, ceramics, graphite (carbon), PBI (polybenzimidazole), PTFE, polyaramides, such as KEVLAR and NOMEX, metals including metal wire or mesh, polyolefins such as TYVEK, polyesters such as DACRON or REEMAY, polyamides, polyimides, thermoplastics such as KYNAR and TEFZEL, polyether sulfones, polyether imide, polyether ketones, novoloid phenolic fibers such as KYNOL, cotton, asbestos and other natural as well as synthetic fibers. The substrate may comprise a yarn, filament, monofilament or other fibrous material either as such or assembled as a textile, or any woven, non-woven, knitted, matted, felted, etc. material. The polyolefin may be polyvinyl alcohol, polypropylene, polyethylene, polyvinyl chloride, polyurethane, etc. alone or in combination with one another. The acrylics may be DYNEL, ACRILAN and/or ORLON. RHOPLEX AC-22 and RHOPLEX AC-507 are acrylic resins sold by Rohm and Haas which may also be used. The cellulosic fibers may be natural cellulose such as wood pulp, newsprint, Kraft pulp and cotton and/or chemically processed cellulose such as rayon and/or lyocell.

The fly ash may be obtained from JTM Industries, Inc. of Martin Lake and Jewett, Tex. and preferrably has particle size such that less than 0.03% remains on an agitated 0.1 inch×0.1 inch screen. Ceramic microspheres are manufactured by Zeelan Industries of 3M Center Bldg., 220-8E-04, St. Paul, Minn. 55144-1000. Calcium carbonate may be obtained from Franklin Industrial Minerals of 612 Tenth Avenue North, Nashville, Tenn. 37203.

Substrates having an ionic charge were coated on one and both sides with a coating having essentially the same ionic charge in the manner described in U.S. Pat. No. 5,965,257 the entire disclosure of which is incorporated herein by reference. As noted above, the one and two sided coated structural articles are available as the product VersaShield® from the Elk Corporation of Dallas. The one or two sided coated structural article is then coated with an adhesive so that the water vapor impermeable material may be attached thereto. In a preferred embodiment, the coated structural article runs on a traditional line where a hot melt adhesive is extruded onto it. Water vapor impermeable metal foil and/or preformed plastic film is then applied from preformed rolls via a press roll and a chiller roll which serve to press the foil or the film onto the adhesive covered coated structural article and then chill the product immediately. Although the adhesive may be applied by any traditional means, such as spraying or hand brushing, applicants' preferred method of applying the adhesive is by extruding a hot thin film. Utilizing an extruder enables one to include a variety of components which are available in pellet form, such as color additives, antioxidants, flame retardants and other constituents.

The adhesive may be any substance capable of adhering the water vapor impermeable material to the coated substrate. Preferred adhesives are those which are capable of hot film extrusion, such as those selected from the group consisting essentially of low density polyethylene, high density polyethylene, polyethylene-vinyl acetate, polypropylene, polyvinylidene chloride, polyester, nylon and mixtures thereof. Applicants' preferred adhesive is a hot polyethylene film extruded onto the coated substrate.

The preformed plastic film is a cold preformed film having a thickness ranging from 0.5 mil to 4 mil. Preformed high density polyethylene, polypropylene and vinyl acetate films may be used, as may any other preformed plastic film having water vapor impermeable characteristics. The thickness of the film is determined by the permeability requirements of the final application. The term "water vapor impermeable material" as used herein by applicants does not mean that the material must satisfy zero $g/m^2/24$ hr water vapor permeability requirements. Rather, the term means materials that satisfy water vapor permeability requirements from 0 to 5 $g/m^2/24$ hr. Water vapor transmission values for various tested materials are provided below:

EXAMPLE I

A coating prepared with the ingredients and percentages described in composition "C" of Table I was used to coat a fiberglass mat on one side. The mat was manufactured by Elk Corporation of Ennis and had a basis weight of 1.7 lb/100 ft$^2$ (1.7 lb/sq.). The dry weight of coating applied was 9.3 lb/sq. ("Coated Mat I").

A 0.002 inch (2 mil) preformed film of high density polyethylene (HDPE) was laminated to the uncoated side of Coated Mat I using 0.6 lb/sq of linear low density polyethylene extrudate as the adhesive.

EXAMPLE II

In the same manner as Example I, a 1.7 lb/sq fiberglass mat was coated on both sides with coating "C" of Table I. The total dry weight of coating applied was 16.4 lb/sq. ("Coated Mat II").

A 0.002 inch (2 mil) preformed film of high density polyethylene (HDPE) was laminated to the second-coated side of Coated Mat II using 0.6 lb/sq of linear low density polyethylene extrudate as the adhesive.

EXAMPLE III

Aluminum foil, 0.0003 inch (0.3 mil), was laminated to the uncoated side of Coated Mat I using 0.6 lb/sq. of linear low density polyethylene extrudate as the adhesvie.

EXAMPLE IV

Aluminum foil, 0.003 inch (0.3 mil), was laminated to the second-coated side of Coated Mat II using 0.6 lb/sq. of linear low density polyethylene extrudate as the adhesive.

Water Vapor Transmission Rate Test Procedure

The procedure used is essentially that described in ASTM E-96. About 30 grams of water are placed in a Vapometer cup (Thwing-Albert, Philadelphia, Pa.). A diecut 3.00 inch diameter test specimen is placed in the flange at the top of the cup, the gasketed flange cover is positioned over the specimen and the six machine screws are tightened with a plier. The entire cup assembly is weighed on an analytical balance.

The Vapometer cup assembly is placed in a dessicator containing Drierite (anhydrous calcium sulfate). After about seven days (the exact time is recorded), the Vapometer cup assembly is removed from the dessicator and reweighed. The water vapor transmission rate (WVT) in grams per square meter per 24 hours ($g/m^2/24$ hr) is calculated from the exposed area of test specimen, the loss in water weight from the cup and the time.

TABLE II

WATER VAPOR TRANSMISSION VALUES

| Coated Product Designation | Water Vapor Transmission Rate (g/m²/24 hr) |
| --- | --- |
| Coated Mat I | 394.9 |
| Coated Mat II | 383.5 |
| Example I | 0.9 |
| Example II | 0.9 |
| Example III | 4.3 |
| Example IV | 2.3 |

The water vapor impermeable metal foil material may be aluminum, copper, zinc or any other metal that may be formed into a light weight pliable foil. The thickness of the foils is preferably 0.5 mil or less. The water vapor impermeable metal foil(s) or preformed plastic film(s) may be applied to both sides of a coated substrate by applying the material to one side as described above and then repeating the process on the other side. In such cases, the metal foils covering the two sides of the coated substrate may be the same or different. Similarly the same or different preformed plastic films may cover the two coated sides of the substrate. Also a water vapor impermeable metal foil may be applied on one side of the coated substrate and a water vapor impermeable plastic film may be applied on the other side of the coated substrate.

As noted above, the structural articles of the present invention are particularly well suited for carpet installations on damp concrete. When the structural articles are employed as such carpet underlayments, or interplies, it is believed that the coated portion of the article absorbs water and water vapor, and the water vapor impermeable material protects the carpet from staining.

Typical properties of the inventive carpet underlayments or interplies are provided in Table III below:

TABLE III

| | |
| --- | --- |
| Basis Weight (lb/100 ft²) | 19.3 |
| (g/m²) | 942 |
| Thickness (mil) | 42 |
| (mm) | 1.07 |
| Frazier Porosity (cfm/ft²) | <1.0 |
| Tensile Strength MD | 90 |
| (lb/1" width) CD | 44 |
| Elmendorf Tear MD | 638 |
| (gram) CD | 1374 |
| Moisture Vapor Transmission (lb/1000 ft²/24 hr) | 0.19 |
| Water Shower Test-4 Hours | Pass |

Moisture vapor transmission tests were preformed according to ASTM E-96 using Vapometer cups. Water was placed in the cups and Drierite in the dessicator for a 100% to 0% gradient across the test specimen.

The preferred carpet underlayment configuration is to place the film or foil side up. The coating on the other side absorbs moisture from the concrete, while the foil or film provides an impervious moisture barrier on which the carpet may be placed. Seaming the underlayment may be achieved using adhesive or a waterproof tape. Overlapping the underlayment layers is not recommended because the 42–44 mil thickness of each layer may result in an uneven surface which could allow moisture vapor transmission.

Structural articles of the present invention covered with water vapor impermeable metal foils may also serve as radiant energy barriers. Possible uses include applying the radiant barrier to a roof (with the foil side up) for utilization under roofing shingles and applying the radiant barrier in the attic of a dwelling with the foil side of the structural article placed up against the rafter. Because the coating on one side of the radiant barrier structural article protects the foil film, thinner and therefore less expensive foil film may be used to provide radiant barriers in a number of applications. For instance, the structural article of the applicants' invention can be cut into strips and wrapped around hot pipes in e.g., oil fields, industrial facilities and buildings. If the foil is placed against the pipe, it is protected by the tough, durable coating on the other side of the substrate and heat is radiated back into the pipe thus reducing energy costs.

The structural articles of the present invention covered with vapor impermeable metal foils may also serve as flame and heat dissipating barriers. Possible uses include combinations with hardboard for use in office partition panels and similar constructions to meet product flammability standards. In such embodiments, the article may be attached to the hardboard to achieve a resulting product that is a flame and heat dissipating barrier in office partition panels. The hardboard may be a ⅛" to ⅜" hot-pressed composite of wood and paper fibers and phenol-formaldehyde resin. The article may be attached to the hardboard by use of adhesives or well known fasteners such as nails or screws. Preferably, the article is laminated to the hardboard by well known lamination techniques to produce a resulting laminate flame and heat dissipating barrier.

Additionally, the structural articles of the invention may be used as relatively low cost thin foil film hygienic barriers in, e.g. the dairy industry at the point of raw milk collection.

It should be understood that the above examples are illustrative and that compositions other than those described above can be used while utilizing the principles underlying the present invention.

We claim:

1. A structural article comprising a substrate having an ionic charge,
    (a) coated on one side with a coating having essentially the same ionic charge wherein said coating consists essentially of a filler material and a binder material and wherein said binder material bonds the filler material together and to the substrate and wherein said coating does not bleed through said substrate; and
    (b) covered on the other side with a water vapor impermeable coating comprising a material selected from the group consisting of metal foils and preformed plastic films;
    wherein said material is attached to said coated substrate with an adhesive.

2. A structural article comprising a substrate having an ionic charge coated on both sides with a coating having essentially the same ionic charge wherein said coating consists essentially of a filler material and a binder material and wherein said binder material bonds the filler material together and to the substrate and wherein said coating does not bleed through said substrate;
    wherein one side of said coated substrate is covered with a water vapor impermeable coating comprising a material selected from the group consisting of metal foils and preformed plastic films; and
    wherein said material is attached to said coated substrate with an adhesive.

3. A structural article according to claim 2, wherein one side of said coated substrate is covered with a metal foil water vapor barrier material and the other side of said coated substrate is covered with a preformed plastic film water vapor impermeable material; and wherein both water vapor impermeable materials are attached to said coated substrate with an adhesive.

4. A structural article according to claim 2, wherein both sides of the coated substrate are coated with a metal foil water vapor impermeable material and wherein said water vapor impermeable material is attached to said coated substrate with an adhesive.

5. A structural article according to claim 2, wherein both sides of the coated substrate are coated with a preformed plastic film water vapor impermeable material and wherein said water vapor impermeable material is attached to said coated substrate with an adhesive.

6. A structural article according to claims 1, 2, 3, 4 or 5 wherein said adhesive is selected from the group consisting of low density polyethylene, high density polyethylene, polyethylene-vinyl acetate, polypropylene, polyvinylidene chloride, nylon, polyester and mixtures thereof.

7. A structural article according to claim 6, wherein said coating is from 84% to 96% filler selected from the group consisting of fly ash, charged calcium carbonate, ceramic microspheres and mixtures thereof and from 16% to 4% acrylic latex binder material.

8. A structural article according to claim 7, wherein said coating further includes SBR rubber.

9. A structural article according to claim 8, wherein said acrylic latex binder and said rubber are cross linked.

10. A structural article according to claim 9, wherein said substrate consists essentially of glass fibers bonded together by a mixture of from 99% to 75% urea formaldehyde and from 1% to 25% acrylic latex.

11. A structural article according to claim 6 wherein said article is a carpet underlayment.

12. A structural article according to claim 6 wherein said article is attached to hardboard.

* * * * *

UNITED STATES PATENT AND TRADEMARK OFFICE
CERTIFICATE OF CORRECTION

PATENT NO. : 6,673,432 B2
DATED : January 6, 2004
INVENTOR(S) : Kiik et al.

It is certified that error appears in the above-identified patent and that said Letters Patent is hereby corrected as shown below:

<u>Title page</u>,
Item [57], ABSTRACT,
Line 4, "roof" should read -- group --

<u>Column 1</u>,
Line 8, "6,536,353" should read -- 6,586,353 --

<u>Column 4</u>,
Line 19, "micro spheres" should read -- microspheres --

<u>Column 5</u>,
Line 22, "preferrably" should read -- preferably --

<u>Column 6</u>,
Line 40, "adhesvie" should read -- adhesive --

Signed and Sealed this

Twenty-eighth Day of December, 2004

JON W. DUDAS
*Director of the United States Patent and Trademark Office*